United States Patent [19]

Saucedo

[11] 4,251,173
[45] Feb. 17, 1981

[54] KEY CUTTER

[76] Inventor: Edward Saucedo, 711 N. Copia, El Paso, Tex. 79903

[21] Appl. No.: 954,459

[22] Filed: Oct. 25, 1978

[51] Int. Cl.² ............................ B23C 1/16; B23C 3/30
[52] U.S. Cl. ..................................... 409/82; 24/76 C; 51/100 R
[58] Field of Search ....................... 90/13.05; 29/76 C; 51/100 R; 409/81, 82, 83

[56] References Cited

U.S. PATENT DOCUMENTS

| 983,787 | 2/1911 | Wakeland | 90/13.05 |
| 2,114,597 | 4/1938 | Goddard | 90/13.05 |
| 2,757,578 | 8/1956 | Saucedo | 90/13.05 |

Primary Examiner—Z. R. Bilinsky

[57] ABSTRACT

A key cutter is provided that includes a machine for cutting keys for most pin tumbler or disc tumbler locks. The machine is not a duplicator but is a machine for cutting keys by the code or number. The machine includes a base, turret assembly, and an electric motor for operating or driving a cutting wheel.

4 Claims, 13 Drawing Figures

FIG. 6
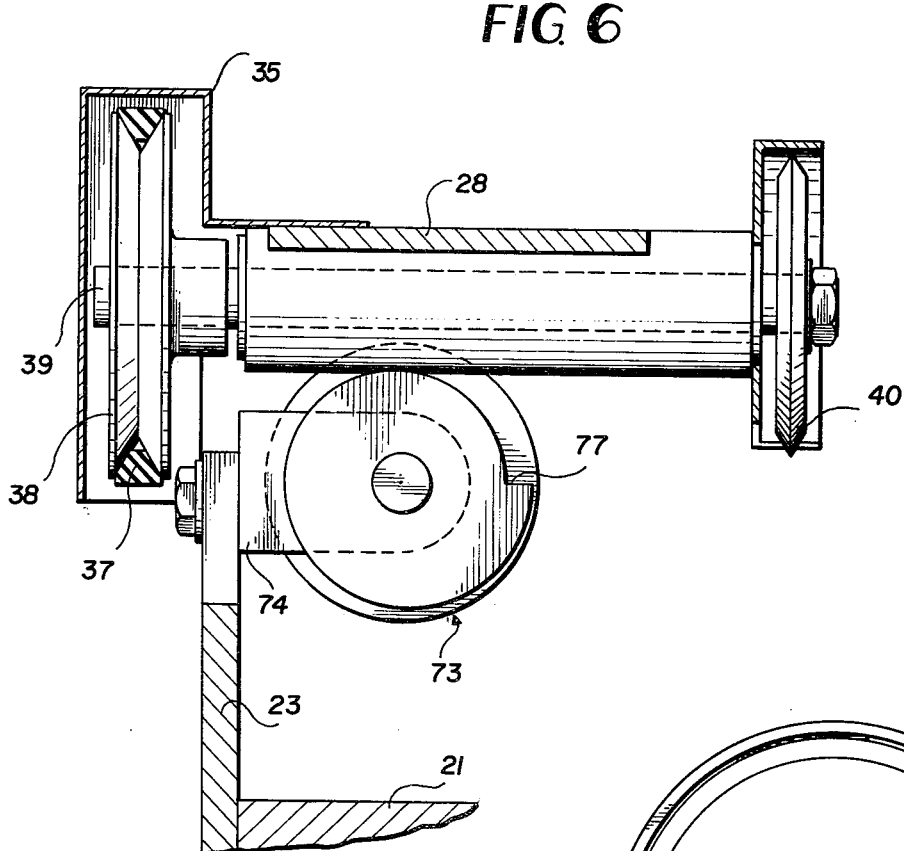
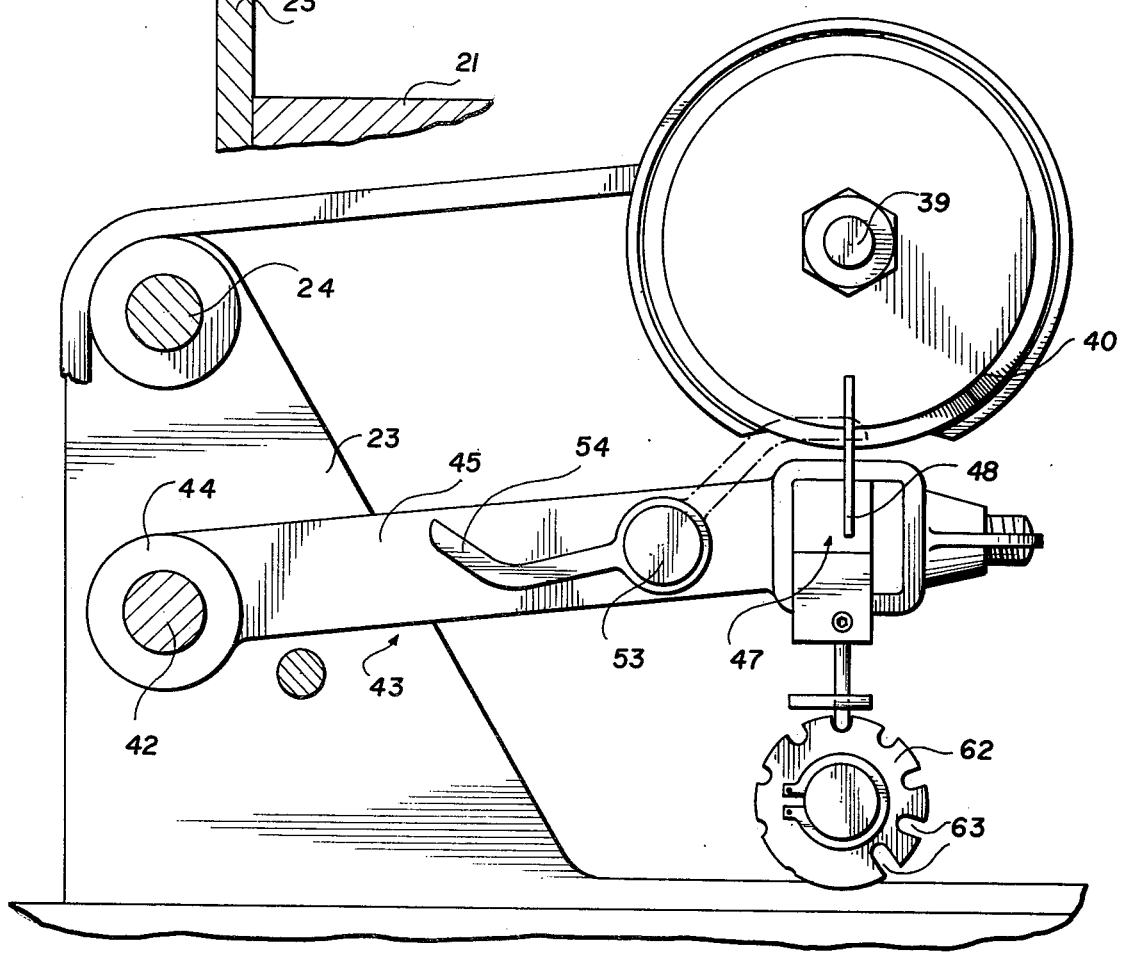
FIG. 4

4,251,173

KEY CUTTER

BACKGROUND OF THE INVENTION

The present invention is a machine for cutting keys by using codes or numbers, and the present invention does not duplicate keys, but permits keys to be cut from a key blank by using coded members that correspond to the key being made.

FIELD OF THE INVENTION

The present invention is a machine for cutting keys for most pin tumbler or disc tumbler locks as, for example, of the type found in cabinet door locks and pad locks as well as in automotive locks of the single sided type and for certain of the double sided ones. The machine of the present invention is not a duplicator, but is a machine for cutting keys by the code or number. The machine is also an excellent machine for master key jobs whether they are large or small because of its accuracy and speed.

A unique feature or aspect of the present invention is to provide a key cutting machine that includes a turret type construction and an important advantage or aspect of the present invention is the cluster of discs. With the present invention, keys can be cut in a very short period of time and as many keys as needed or desired can be cut without touching a single adjustment.

SUMMARY OF THE INVENTION

The present invention is a machine for cutting keys for various types of locks and wherein the machine is not a duplicator but is to be used for cutting keys by the code or number. The machine will operate with accuracy and speed and once the machine is set up for a particular make of lock, all that is necessary to do is set the depth discs for all cuts only once, and then the user can cut one or a hundred perfect keys without changing a single adjustment. Then, to cut the next key in the series, it is only necessary to turn the disc or discs as needed to be changed, and the machine is again ready to cut as many keys as required, and all of them will be coded keys and not duplicates.

The primary object of the present invention is to provide a key cutter that is compact in size, easy and efficient to operate, and wherein the present invention is ruggedly constructed and simple and inexpensive to manufacture and use.

Other objects and advantages will become apparent in the following specification when considered in the light of the attached drawings.

BRIEF DESCRIPTION OF THE DRAWINGS

FIG. 4 is a view generally taken along the line 4—4 of FIG. 1;

FIG. 6 is an enlarged sectional view taken on the line 6—6 of FIG. 1;

DESCRIPTION OF THE PREFERRED EMBODIMENT

Figure 1:
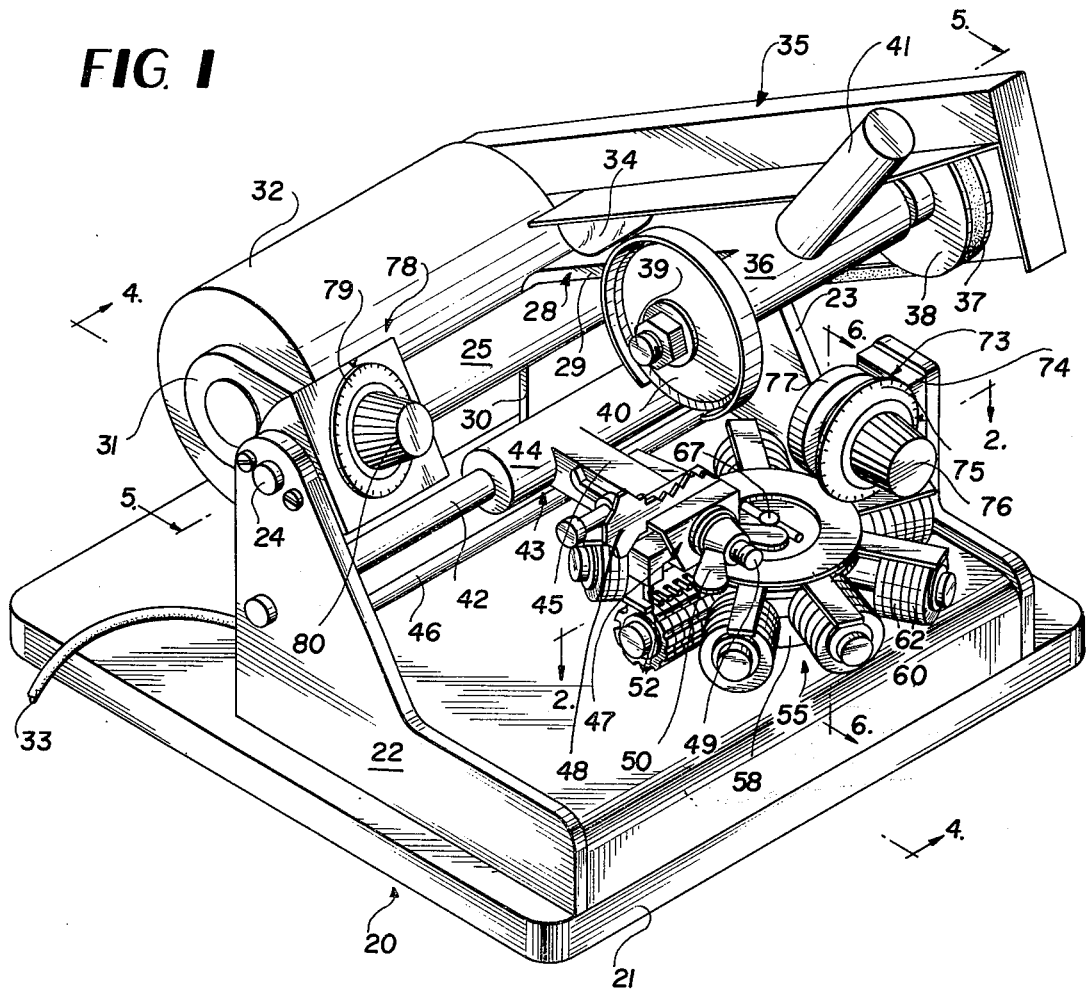
FIG. 1 is a perspective view of the key cutter of the present invention.

Referring now to the drawings in detail, wherein like reference characters indicate like parts throughout the several figures, the numeral 20 indicates the key cutting machine of the present invention that includes a horizontally disposed base 21, and mounted on the base 21 and secured thereto or formed integral therewith are spaced apart vertically disposed side members 22 and 23. A rod member or shaft 24 extends between the side members 22 and 23, and a sleeve 25 is rotatably mounted on the rod member 24. A bearing 26 is arranged continuous to one end of the sleeve 25, FIG. 5, and a coil spring or spring member 27 is circumposed on the rod 24, and the spring 27 serves to exert the proper amount of pressure on the sleeve 25.

A bracket 28 is affixed to the sleeve 25, and the bracket 28 includes first and second portions 29 and 30 that are arranged angularly with respect to each other. A yoke 31 is suitably secured to the portion 30 of the bracket 28, and an electric motor 32 is mounted in the yoke 31. The electric motor 32 is adapted to be electrically connected to a source of electrical energy as for example by means of the wire or cord 33. A light bulb 34 is electrically connected to the circuit so that the operator can readily observe the machine and work being performed, and suitable switch means is provided for turning the motor and light and machine on and off.

The bracket 28 includes a cylindrical portion 36 that defines a collar, FIG. 1.

A support member 35 is suitably secured to the bracket 28, and the support member 35 has a pulley 38 mounted therein on one end of a shaft 39, and the shaft 39 is rotatably mounted in the collar 36. An endless belt 37 is trained over the pulley 38, and the endless belt 37 is also trained over a corresponding pulley on the drive shaft of the electric motor 32. A rotary cutting wheel 40 is mounted on the shaft 39, and a handle 41 is secured to the bracket 28 so that the parts can be manually moved in the desired manner.

A rod 46 extends between the side members 22 and 23 and is secured thereto, and a carriage 43 is adjustably connected to the rod 42. The carriage 43 includes a cylindrical member 44 that is rotatably and slidably mounted on the rod 42, and an arm 45 is secured to or formed integral with the cylindrical member 44. A cross piece 46 extends between the side members 22 and 23, and the cross piece 46 is adapted to be selectively engaged by the arm 45 for limiting downward movement of the carriage 43.

Mounted on the end of the arm 45 is a key clamp 47 which is adapted to clamp or hold a key blank 48 therein, FIG. 1. A screw member or securing element 49 is arranged as shown, and a wing nut 50 is arranged in threaded engagement with the securing element 49. A support piece 51 is arranged contiguous to the clamp 47, and a probe or pin 52 depends from the support piece 51. A bolt member 53 is connected to the arm 45, and an adjustable finger 54 is mounted on the member 53 so that, for example, the member 54 can move into and out of the solid and broken line position shown in FIG. 4.

Figure 3:
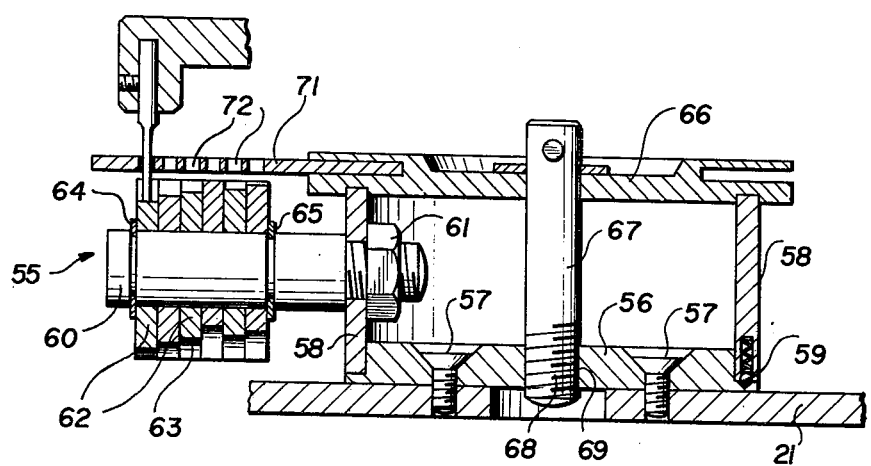
FIG. 3 is a sectional view taken on the line 3—3 of FIG. 2.
Figure 7:
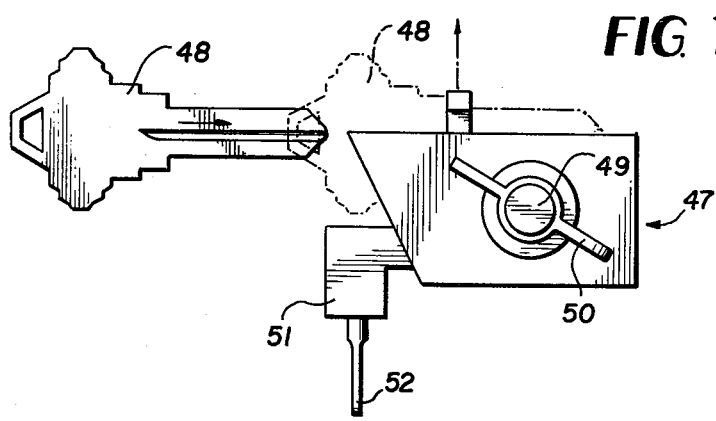
FIG. 7 is a fragmentary elevational view illustrating the key clamp.
Figure 8:
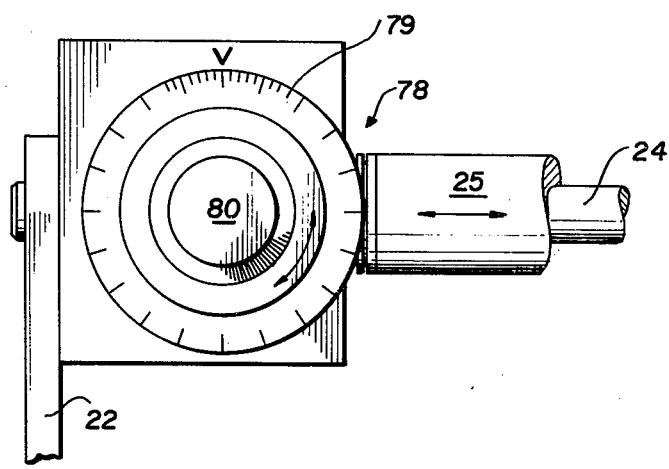
FIG. 8 is an elevational view illustrating an adjustment member.
Figure 9:
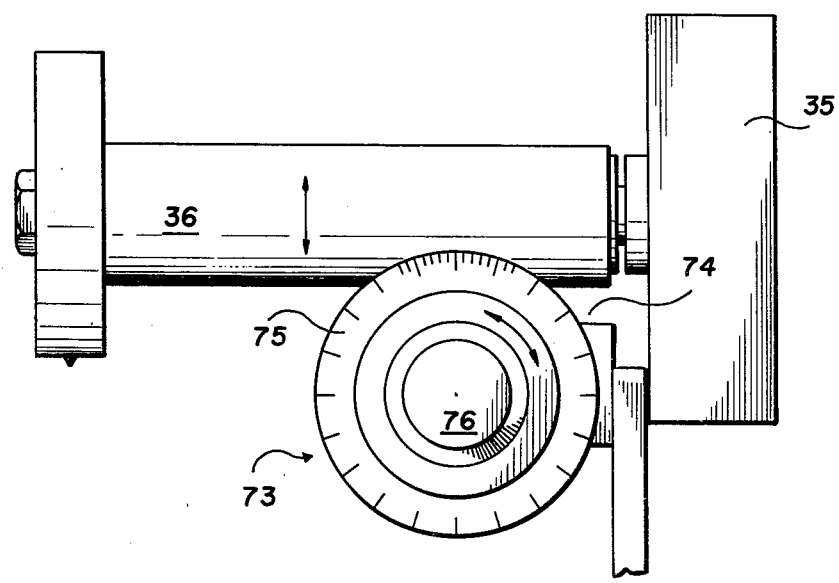
FIG. 9 is a view of another adjustment member.
Figure 10:
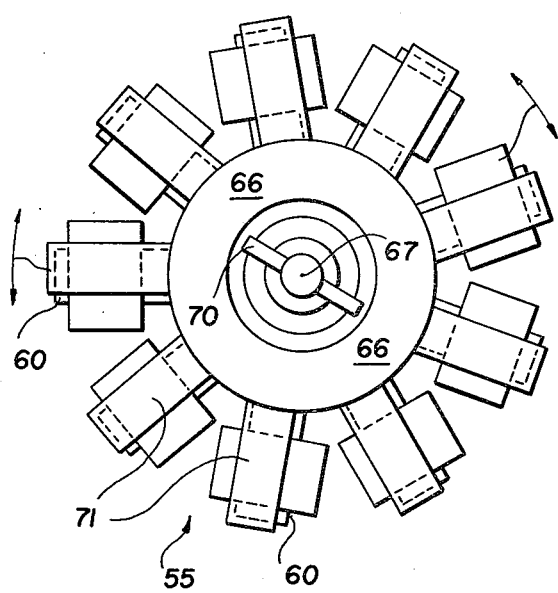
FIG. 10 is a schematic view illustrating the turret assembly.
Figure 11:
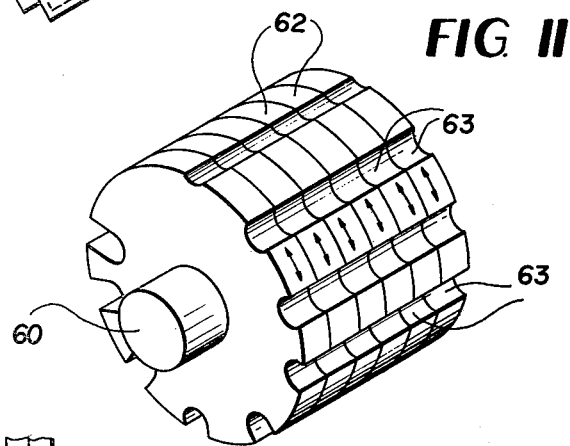
FIG. 11 is a perspective view of one of the clusters of discs for the turret assembly.
Figure 12:
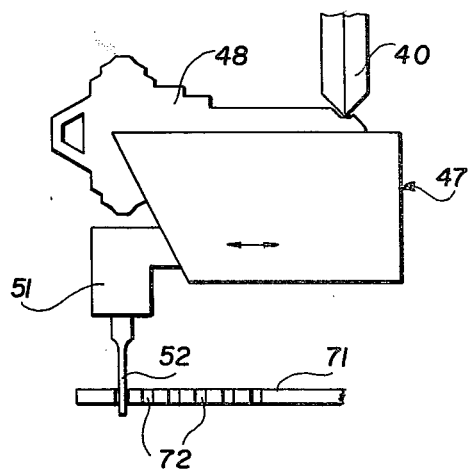
FIGS. 12 and 13 are schematic elevational views illustrating the cooperation of the clamp and probe with the slotted members.
Figure 13:
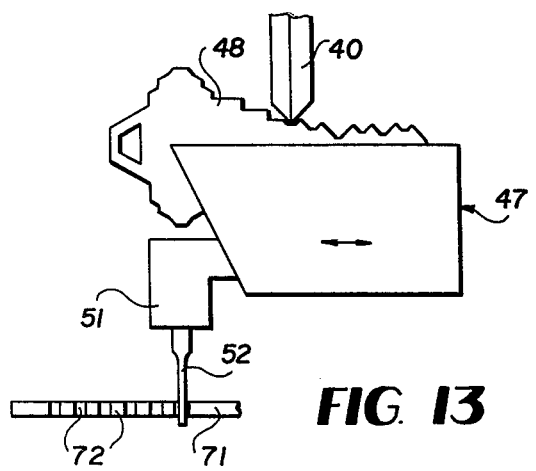

There is further provided a turret assembly indicated generally by the numeral 55, and the turret assembly 55 includes a stationary bottom piece 56 that is secured as at 57 to the base 21, FIG. 3. A cylindrical rotary member 58 is rotatably mounted on the member 56 as at 59. A plurality of radially disposed studs 60 are mounted in the cylindrical member 58, and the studs 60 are retained in place on the member 58 by means of nuts or securing elements 61. A plurality of cluster discs 62 are rotatably mounted on the studs 60, and the discs 62 have notches 63 therein with numbers or indicia on the discs 62 corresponding to the notches 63. Retainers 64 and 65 are provided for maintaining or retaining the discs 62 in place on the studs 60. A plate member 66 is mounted on the element 58, and a screw member 67 extends through the plate member 66, the lower end of the screw member 67 being threaded as at 68 for threadedly engaging an opening 69 in the bottom piece 56. A finger engaging member 70 is provided on the upper end of the screw or bolt 67 for facilitating the manual turning or rotation thereof. Carried by the plate 66 is a plurality of radially disposed spaced apart bars 71 which have notches or recesses 72 therein, and the pin 52 is adapted to be selectively extended through certain of these notches 72 to engage the recesses 63 in the discs 62 as shown in FIG. 3.

A control member 73 is provided for the machine, and the control member 73 includes a support piece 74 that is secured to the side member 23, and a dial 75 is provided with indicia or markings thereon for rotation by a manually operable knob 76, and the knob 76 is used for turning or rotating a cam 77.

Figure 5:
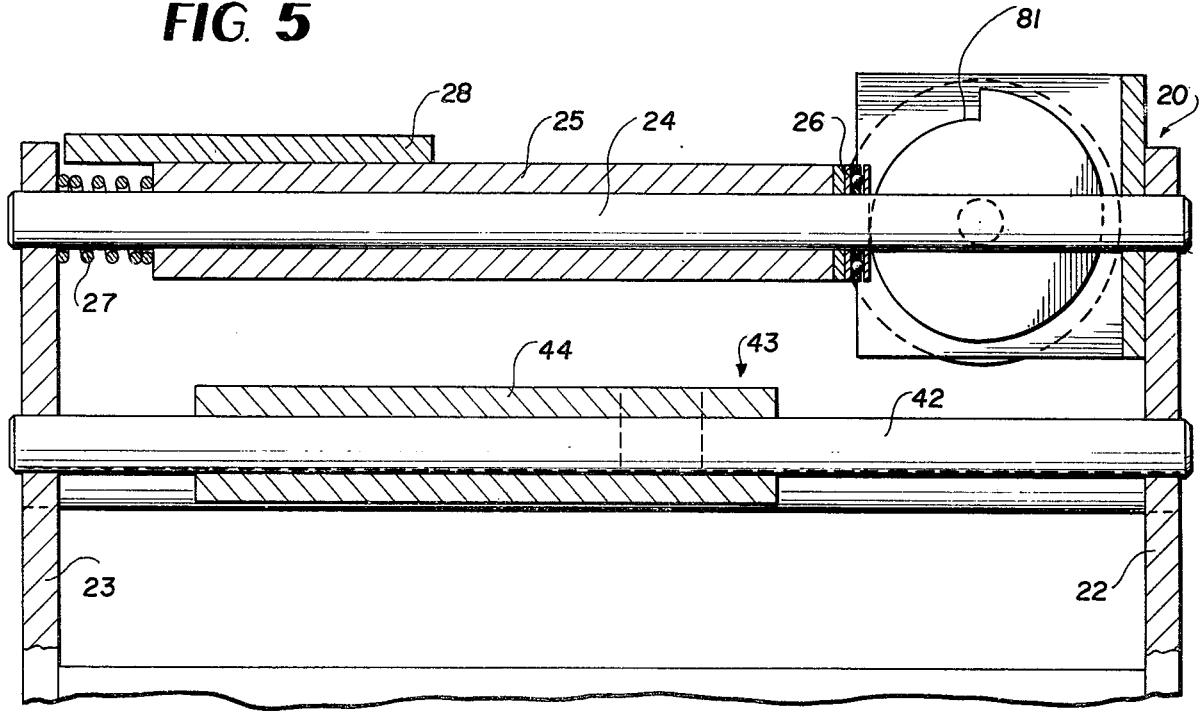
FIG. 5 is an enlarged sectional view taken on the line 5—5 of FIG. 1.
Figure 2:
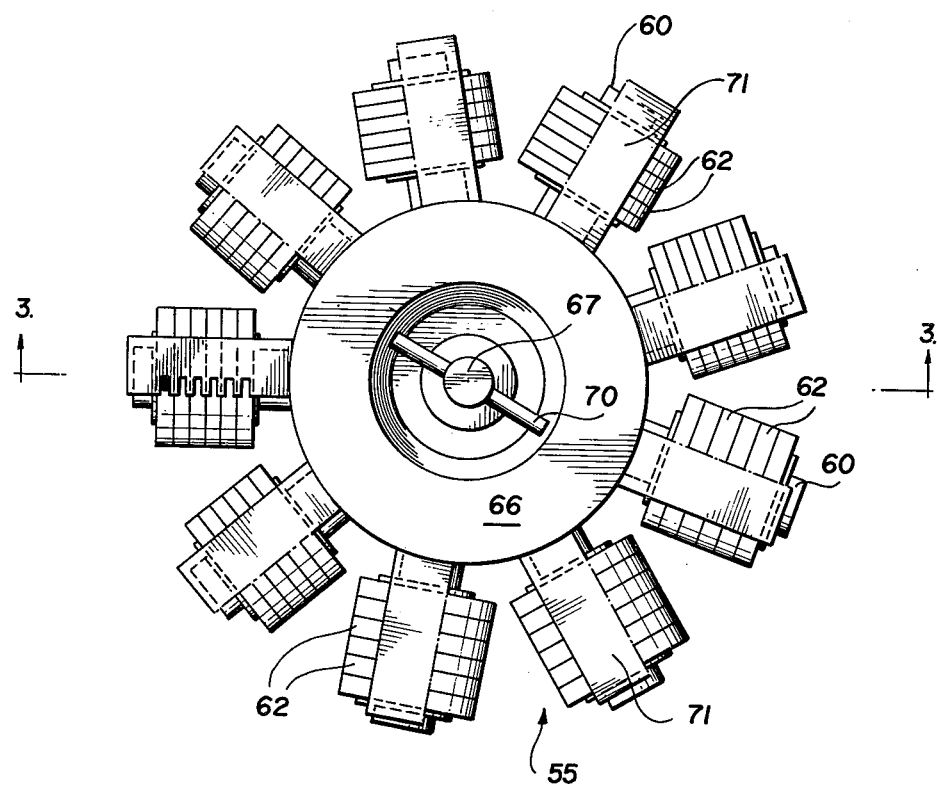
FIG. 2 is a sectional view taken on the line 2—2 of FIG. 1.

There is further provided a control mechanism 78 that includes a dial 79 with markings or indicia thereon, and a manually operable knob 80 is provided on the unit 78 for rotating or adjusting a cam 81, FIG. 5.

From the foregoing, it will be seen that there has been provided a key cutter which consists of a machine for cutting keys and wherein the present invention is not a duplicator but is a machine for cutting keys by the code or number.

The parts can be made of any suitable material and in different shapes or sizes as desired or required.

A chart is adapted to be furnished with the machine for the various settings as, for example, when cutting the Yale type of coded key, a proper shoulder setting is made as well as the discs being set for the proper depth, and the space and stops are also set.

In use, with the parts as shown in the drawings, initially the proper blank 48 is set in the key vise or clamp 47 and the shoulder gauge 54 can be used if the key does not have two shoulders or if the shoulders are uneven. The shoulder adjusting nut can be turned to the proper setting. Then, the T nut 70 on top of the turret 55 can be loosened and turned until a number such as the number 19 cluster of discs 62 is in position to the operator's left and parallels the shafts. The disc 62 is turned with the spacing plate until, for example, a plate or bar 71 with the number 165 is directly over the cluster number 19.

Next, the key carriage 43 with the index pin 52 is brought on top of the spacing plate 71, and the cluster and plate are adjusted so that the pin 52 will move freely up and down into the notches 63 on the discs 62 and then the nut 70 is tightened.

Next, the carriage 43 is moved to the left and set at rest and then the code numbers are set on the discs 62, and the first cut is the first disc on the right.

When all five or six discs are set, the index pin 52 is placed over the first disc, and then the cutter assembly including the cutter wheel 40 is lowered by pulling on the handle 41 and the user starts cutting the first cut in the blank 48 all the time moving the carriage 43 from side to side but not up, and similarly all other cuts are made in the same manner.

The notches can start with the number or marking 0 and end with 0 or 10 if the code for that particular lock runs from 0 to 9, or from 1 to 10, a disc can be used without adding or subtracting a number. After a combination has been set on the disc cluster, the user can cut a key in a short period of time such as 15 seconds, or as may keys as desired can be cut without touching a single adjustment.

It will therefore be seen that there has been provided a machine for cutting keys for most pin tumbler or disc tumbler locks as, for example, the type found in cabinet door locks and pad locks. The machine can also be used in conjunction with automotive locks of the single sided type and for some of the double sided ones. The machine is not a duplicator but is a machine for cutting keys by the code or number, and the machine is also especially suitable for master key jobs whether they are large or small because of its accuracy and speed. Once the machine has been set up for a particular make of lock, it is only necessary to set the depth discs for all cuts only once and then these can be cut one key at a time or a hundred perfect keys without changing a single adjustment. Then, to cut the next key in the series, it is only necessary to turn the disc or discs as needed to be changed and the operator is again ready to cut as many keys as required and all of them will be coded keys and not duplicates.

Coded keys for pin and wafer tumbler locks are adapted to be cut according to the following:
(1) Spacing from shoulder to center of first pin.
(2) Spacing from center to center of each pin.
(3) Distance from bottom of key to bottom of number one cut.
(4) Variation between each size of tumbler—1 or 0 to 9 or 10 (10).

The machine is adapted to have 10 sets of discs with notches cut in increments of 0.0125, 0.014, 0.015, 0.018, 0.019, 0.020, 0.023, which will accomodate spacers 0.094, 0.125, 0.140, 0.150, 0.156, 0.156 wide and 0.165.

These depths and spacings are used in practically all pin and wafer tumbler locks which are in use today.

An important aspect or unique feature of the machine of the present invention with its turret type construction is that the rotating of either or both of the spacing plates and depth discs or any combinations of spacings and depths can be obtained without adding to, or removing from, or changing or otherwise altering the machine. The most important feature is the cluster of discs. Each cluster contains six discs, except one which has seven discs for seven tumbler locks such as those made by Best Security Systems and others. Each disc is notched in proper increments with eleven notches which are progressively deeper for the proper increment for that particular cluster as required by different manufacturers, such as: 0.015 0.018, 0.020, and the like.

Having thus described the preferred embodiment of the invention it should be understood that numerous structural modifications and adaptations may be resorted to without departing from the spirit of the invention.

I claim:

1. In a key cutter, a base, spaced apart side members on said base, a rod member extending between said side members, a sleeve rotatably mounted on said rod member, a bracket secured to said sleeve, electric motor means mounted adjacent said bracket and said motor means adapted to be eletrically connected to a source of electrical energy, a support member affixed to said bracket, said bracket including a cylindrical collar, a driven shaft mounted in said collar, belt and pulley means operatively connecting said motor means to said driven shaft, a handle connected to said collar, a rotary cutter mounted on said driven shaft, a rod element extending between said side members and secured thereto, a carriage operatively connected to said rod element and said carriage including a cylindrical member rotatably and slidably mounted on said rod element, an arm affixed to said cylindrical member, a clamp on the outer end of said arm defining a vise for a key blank, an index pin mounted adjacent said vise, a turret assembly including a rotary cylindrical unit mounted on said base, a plurality of radially disposed studs mounted in said cylindrical unit, a plurality of discs having notches therein, a plate member mounted on said cylindrical unit, and a plurality of radially disposed bars operatively connected to said plate member, and said bars having notches therein.

2. The structure as defined in claim 1 and further including manually operable adjustment means for controlling movement of the sleeve on the rod member, and said last named means including a cam.

3. The structure as defined in claim 2 and further including a manually operable adjustable unit for controlling downward swinging pivotal movement of the bracket and cutter.

4. The structure of claim 3 wherein said manually operable adjustable unit includes a cam for controlling downward swing.

* * * * *